United States Patent [19]

Spongr et al.

[11] Patent Number: 5,103,471
[45] Date of Patent: Apr. 7, 1992

[54] APPARATUS FOR MEASURING THE THICKNESS OF A COATING

[76] Inventors: Jerry J. Spongr, 600 Loretta St., Tonawanda, N.Y. 14150; Masood Fakharzadeh, 6282 Bridlewood Dr. S., East Amherst, N.Y. 14051

[21] Appl. No.: 642,476

[22] Filed: Jan. 17, 1991

[51] Int. Cl.$^5$ .............................................. G01N 23/16
[52] U.S. Cl. ........................................ 378/55; 378/54; 378/206; 250/308; 250/359.1; 250/360.1; 250/491.1; 250/223 R
[58] Field of Search ................. 378/55, 50, 54, 89, 378/204–206; 250/308, 358.1, 359.1, 360.1, 491.1, 571, 223 R

[56] References Cited

U.S. PATENT DOCUMENTS

| | | | |
|---|---|---|---|
| 3,621,259 | 11/1971 | Boissevain | 378/55 |
| 4,383,172 | 5/1983 | Holler et al. | |
| 4,451,732 | 5/1984 | Spongr et al. | |
| 4,656,357 | 4/1987 | Spongr et al. | |
| 4,678,915 | 7/1987 | Dahlquist et al. | 250/308 |
| 5,021,666 | 6/1991 | Reber | 250/359.1 |

Primary Examiner—Janice A. Howell
Assistant Examiner—David P. Porta
Attorney, Agent, or Firm—Hodgson, Russ, Andrews, Woods & Goodyear

[57] ABSTRACT

An apparatus for measuring the thickness of a coating on an elongate strip of material which moves along a predetermined path from a first location to a second location. The apparatus includes a measuring device, at least a portion thereof being mounted on a shuttle for movement parallel with the elongate strip. The shuttle is mounted on a support frame for movement back and forth along the frame. The shuttle is further provided with a target-spotting device. A drive extends between the shuttle and the support frame for reciprocating the shuttle along the frame. The drive is responsive to either an on-target signal or an error signal received from the target-spotting device for driving the shuttle from the first location towards the second location to initially position the target-spotting device in registry with the target when an error signal is being received and to subsequently maintain the target-spotting device in substantial registry with the target when an on-target signal is being received so that the measuring device can be maintained in registry with a measurement site having a specific placement relative to the target.

12 Claims, 4 Drawing Sheets

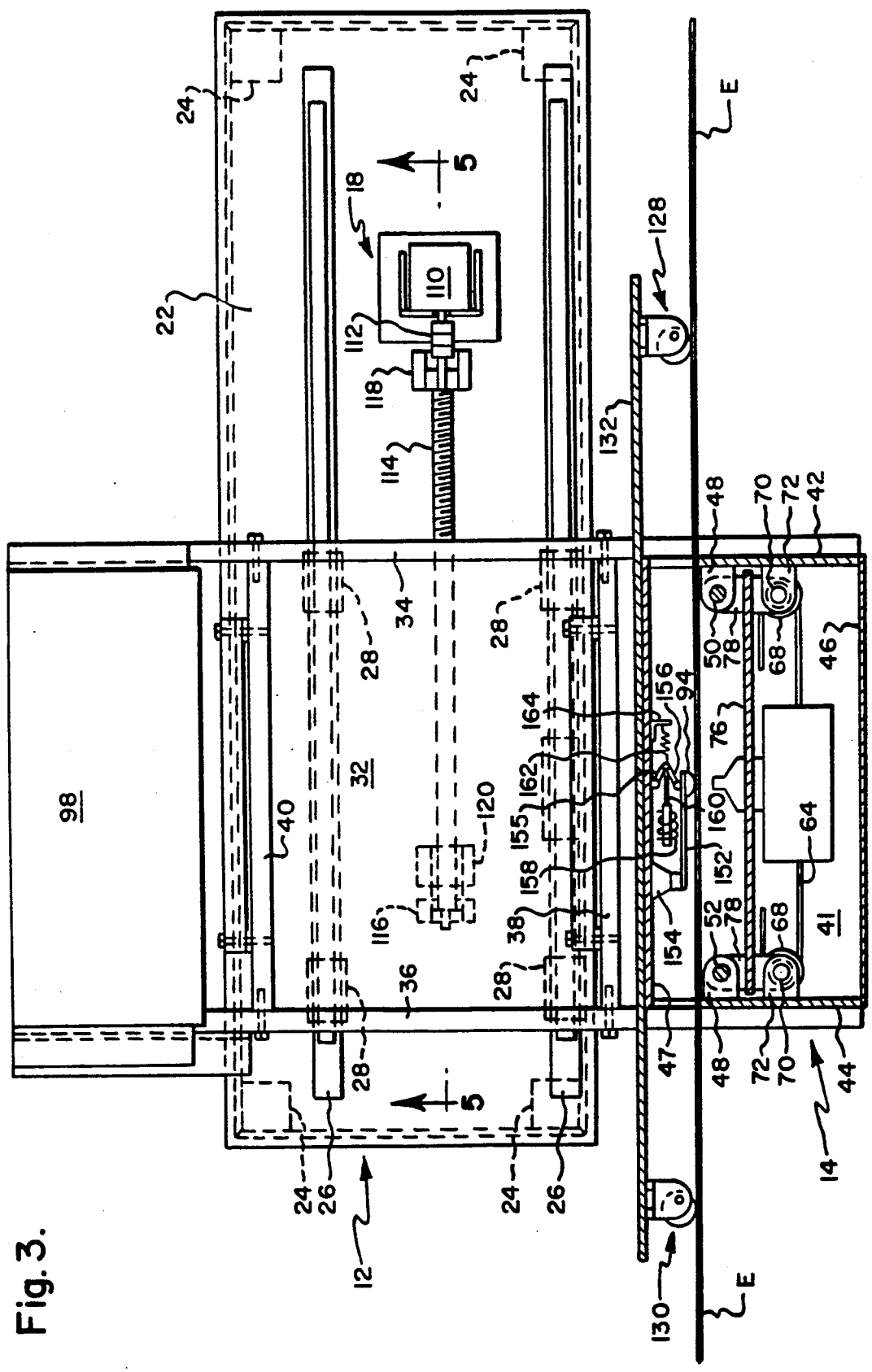

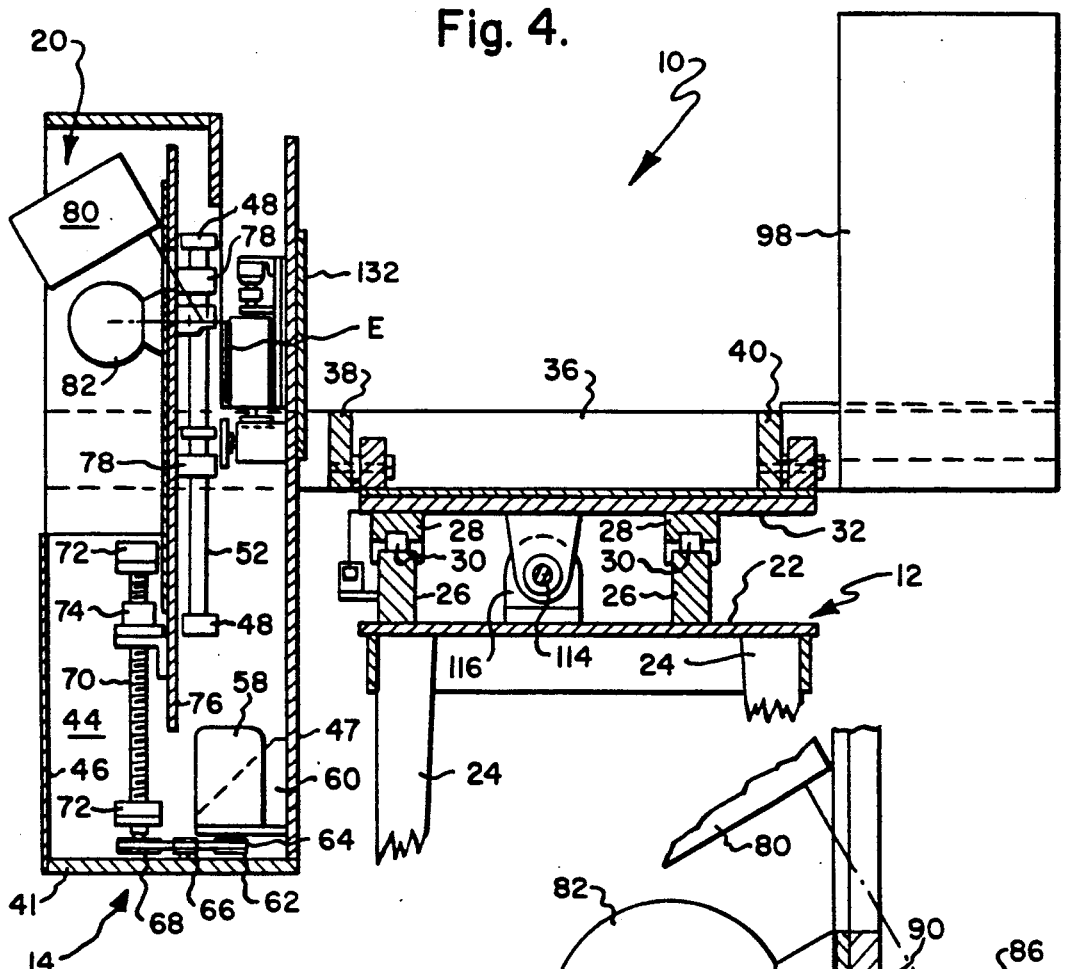

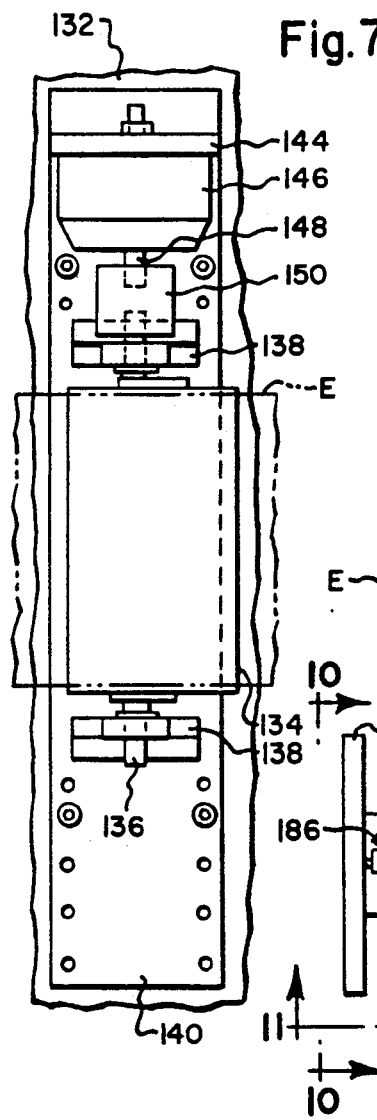
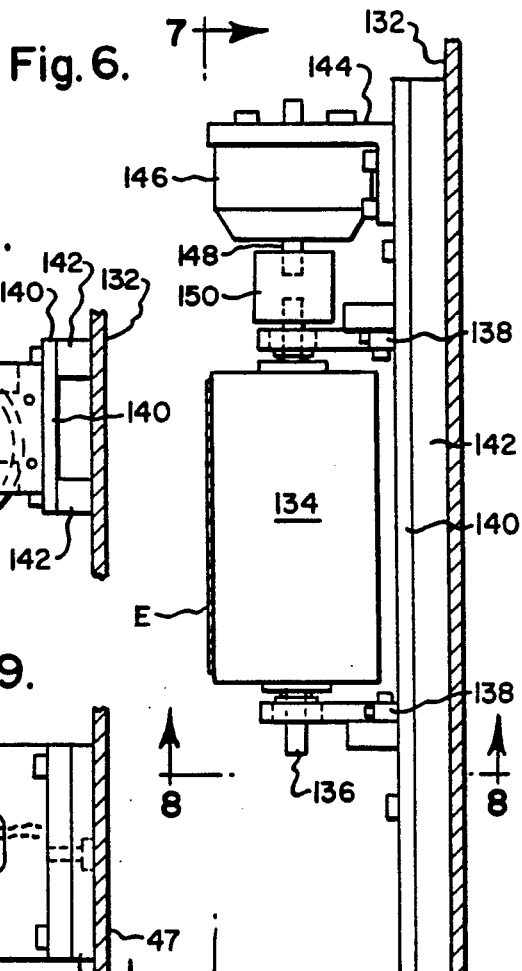
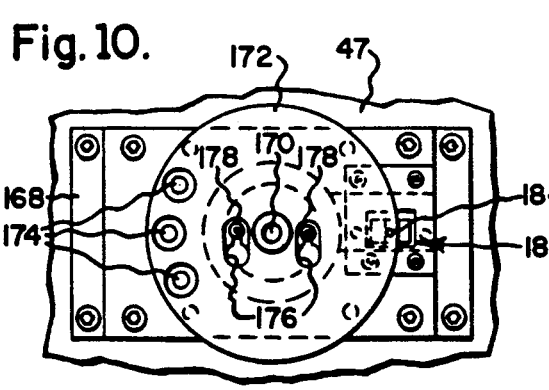
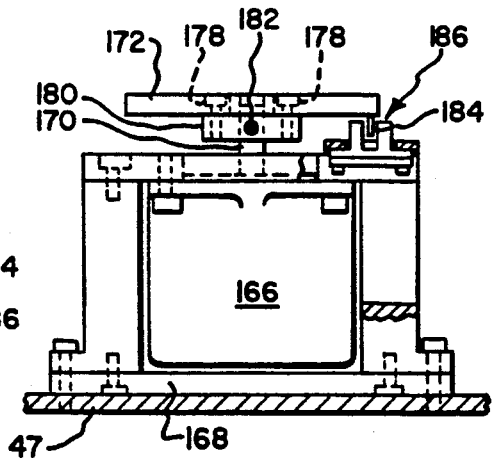

APPARATUS FOR MEASURING THE THICKNESS OF A COATING

TECHNICAL FIELD

The present invention relates generally to an apparatus for measuring the thickness of a coating on an elongate strip of material which moves continuously along a predetermined path, and more particularly to a coating thickness measuring apparatus which is capable of measuring the coating thickness at predetermined measurement sites, which measurement sites have a spatial relationship to corresponding targets carried by the continuously moving elongate strip.

BACKGROUND ART

U.S. Pat. No. 4,383,172 discloses an apparatus for measuring coating thickness on an elongate continuously moving strip of material, the apparatus utilizing beta backscatter techniques which require that a probe be placed into contact with the strip.

U.S. Pat. No. 4,686,357 disclosed an improved apparatus which can measure the thickness of a coating at a selected measurement site by X-ray technology, wherein the strip of material is not contacted by the measurement device.

In both of the foregoing patents a shuttle is utilized which carries at least a portion of the measurement device, the shuttle being caused to be moved in a direction parallel to the strip by physical engagement with the strip. The foregoing designs are satisfactory when the strip has sufficient strength to pull the shuttle along with the strip without being distorted. However, in recent coating applications the coatings have been applied to very fragile carrier strips or films. In this and some other cases, manufacturers of coated strips have indicated that the strip should not to be used as a direct driving means for pulling the shuttle.

OBJECTS AND SUMMARY OF THE PRESENT INVENTION

It is a principal object of the present invention to provide a measuring apparatus which can measure the thickness of a coating on an elongate strip of material at selected measurement sites, while the strip is moving along a predetermined path from a first location to a second location, wherein the correct positioning of the measurement apparatus is achieved without the strip being contacted by the measurement apparatus.

More specifically it is an object of the present invention to provide a measurement apparatus of the character set forth above wherein measuring means, or at least a portion thereof, is mounted on a shuttle for movement parallel with the elongate strip to be measured, the shuttle being mounted on a support frame for movement back and forth along the frame, the shuttle not being pulled by the strip being measured.

A further object of the present invention is to provide a measurement apparatus of the character set forth above wherein the shuttle further is provided with a target-spotting device, and wherein drive means extend between the shuttle and the frame for reciprocating the shuttle along the frame, the drive means being responsive to either an on-target signal or an error signal received from the target-spotting device for driving the shuttle from the first location towards the second location to initially position the target-spotting device in registry with the target when an error signal is being received and to subsequently maintain the target-spotting device in registry with the target when an on-target signal is being received.

The foregoing objects and other objects and advantages of the present invention will be more fully understood after a consideration of the following detailed description taken in conjunction with the accompanying drawings in which a preferred form of this invention is illustrated.

BRIEF DESCRIPTION OF THE DRAWINGS

FIG. 3 is a plan sectional view taken generally along the line 3—3 in FIG. 2.

FIG. 4 is partial side sectional view taken generally along the line 4—4 in FIG. 2.

FIG. 4a is an enlarged fragmentary view of the portion of the structure shown in FIG. 4.

FIG. 5 is a front sectional view taken generally along the line 5—5 in FIG. 3.

FIG. 6 is a side sectional view taken generally along the line 6—6 in FIG. 2.

FIG. 7 is front view of the structure shown in FIG. 6, this view being taken generally along the line 7—7 in FIG. 6.

FIG. 8 is a bottom sectional view of the structure shown in FIG. 6, this view being taken generally along the line 8—8 in FIG. 6.

FIG. 9 is an enlarged detail view of a portion of the structure shown in FIG. 4.

FIG. 10 is a front view taken generally along the line 10—10 in FIG. 9.

FIG. 11 is a bottom view of the structure shown in FIG. 9, this view being rotated 90 degrees clockwise from the bottom view shown in FIG. 8.

DETAILED DESCRIPTION

In General

The apparatus of the present invention is customarily associated with a plating line at a customer's installation to determine whether the thickness of the material coated upon an elongate strip of material meets the standards established by the customer. Thus, with reference to FIG. 1, the customer's plating line is indicated generally at P. An elongate strip of material, indicated generally at E, will be moved from a supply roll, past idler spools or rolls I, through the plating line P, then through the apparatus of the present invention, which apparatus is indicated generally at 10, and then through further idler spools I and drive roll D to a take-up roll T. In order to establish and maintain the thickness of the plating upon the elongate strip of material E, it is necessary to measure the plating thickness as the strip is coming out of the line P. Therefore, it is desirable to provide an apparatus which is capable of measuring the thickness of the coating material placed upon a strip of material as the strip of material emerges from the coating line. Prior apparatus, such as U.S. Pat. Nos. 4,383,172 and 4,656,357, have been developed for this purpose.

Figure 2:
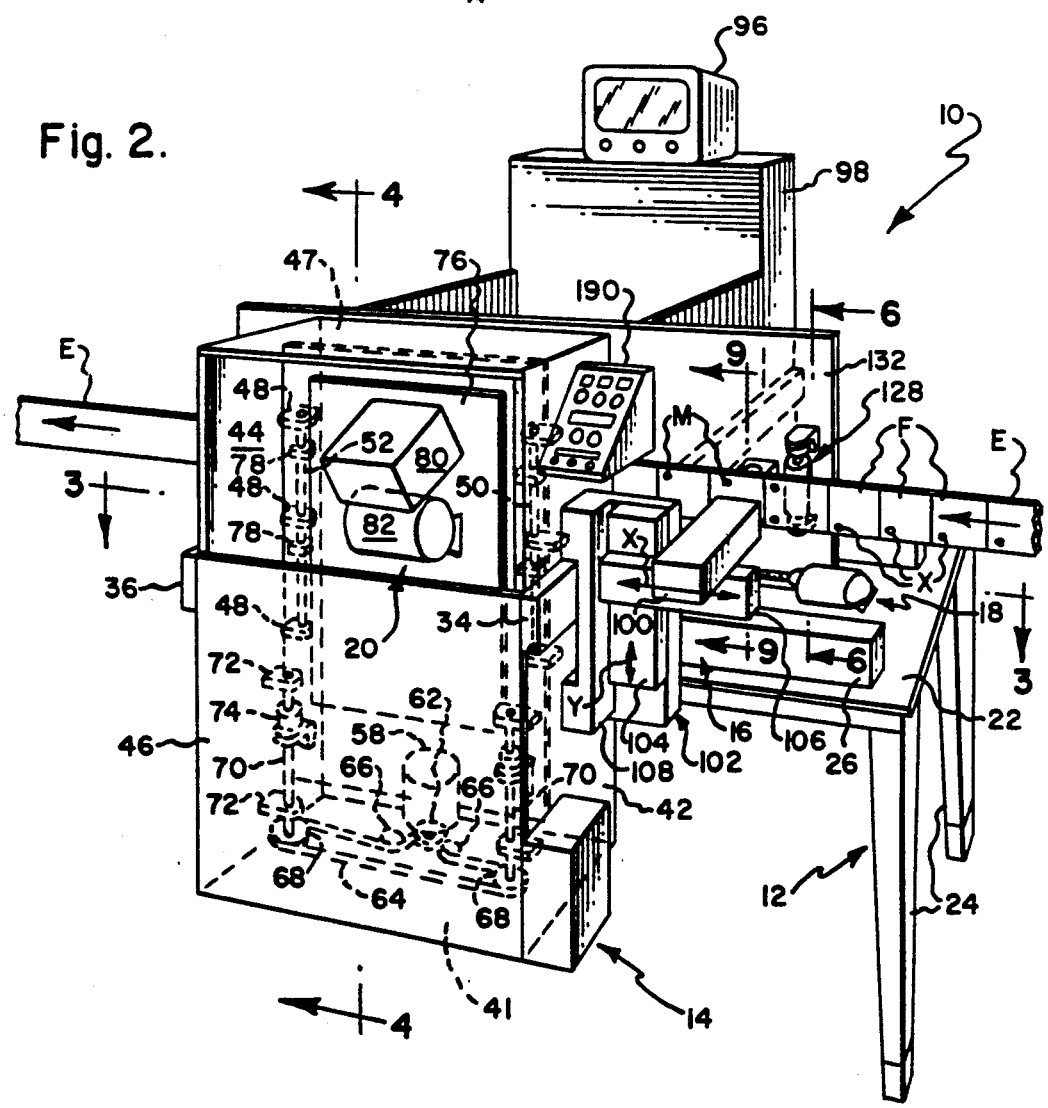
FIG. 2 is a perspective view of the apparatus of the present invention, this view being taken from the upper front right of the apparatus.

The apparatus of the present invention has been developed for use with a specific type of elongate strip material. Thus, the elongate strip with which the apparatus of the present invention is to be associated includes a number of "frames" which "frames" are similar to the frames on a motion picture film, each "frame" having a precise dimensional relationship with respect to every other "frame" on the strip, and each "frame" having a target which bears a specific dimensional relationship with respect to the site where the coating thickness is to be measured. In FIG. 2 each "frame" of the elongate strip of material E is indicated at F, each target on each frame is indicated at X, and each measurement site is indicted at M.

Figure 1:
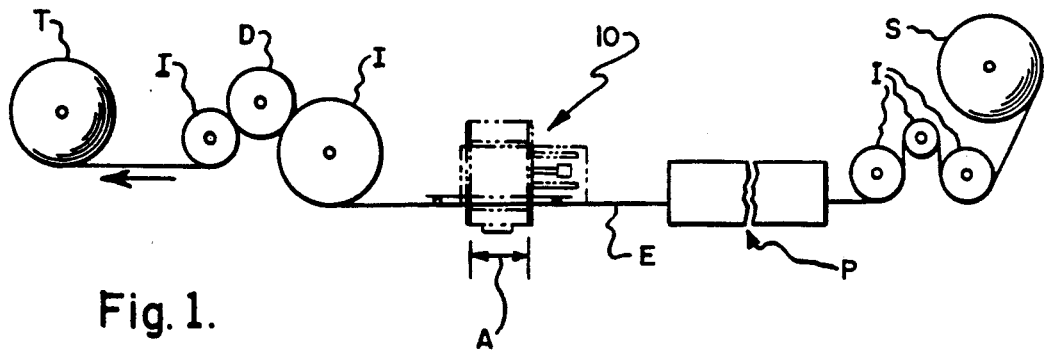
FIG. 1 is a schematic plan view indicating the location of the apparatus of the present invention downstream of a strip plater and showing the manner in which the strip may be moved.

The apparatus of this invention includes, as its major components, a support frame assembly indicated generally at 12 in FIG. 2, a shuttle or shuttle assembly indicated generally at 14, the shuttle being mounted on the frame for movement between first and second locations as indicated by arrow A in FIG. 1, a target-spotting assembly indicated generally at 16 and carried by the shuttle assembly, drive means indicated generally at 18 for driving the shuttle assembly between the first and second positions, and measuring means having portions thereof mounted on the shuttle assembly, the measuring means being indicated generally at 20.

Support Frame Assembly

The support frame assembly 12 can be in various shapes and in the present embodiment it is illustrated as a table having a top 22 and legs 24. Mounted upon the top of the table is the fixed portion 26 of a linear bearing assembly, which bearing assembly includes a movable portion 28 and rollers 30.

Shuttle Assembly

The shuttle assembly includes various mounting components which can be reciprocated between a first right-hand position and a second left-hand position which is shown in the various FIGS. The mounting components include the movable portion 28 of the linear bearing assemblies, each portion 28 being mounted on the lowermost surface of a reciprocating slide plate 32. An H-frame assembly is mounted upon the slide plate 32, the H-frame assembly including right and left front to rear frame members 34, 36, respectively, and front and rear frame members 38, 40, respectively, which extend between the right and left frame members 34 and 36. The front and rear frame members 38, 40 are parallel to the elongate strip E.

Mounted to the front of the shuttle assembly 14 is an open top box-like structure having a bottom wall 41, right and left sides 42, 44, and front and rear walls 46, 47, respectively, this being shown in FIGS. 2 through 4. The sides 42, 44 are supported between the front ends of the right and left frame members 34, 36. Mounted within the box-like structure on the sides 42 and 44 are shaft brackets 48, which shaft brackets support right and left vertically extending shafts 50, 52. A motor 58 is carried by bracket 60 on the rear plate or wall 47 of the box-like structure, the motor having lower output shaft upon which is mounted a drive sheave 62. A drive belt 64 passes over the drive sheave 62, as well as idlers 66 and driven sheaves 68, this best being shown in FIG. 2. Each of the two driven sheaves, which are to the right-side and left-side of the box-like structure, is secured to one end of a lead screw 70. Each lead screw is supported by appropriate bearings 72, the bearings 72 in turn being secured to the right- and left-sides 42, 44. A ball nut 74 is carried by each of the lead screws, the ball nut in turn being secured to a vertically shiftable plate member 76. The plate member 76 is in turn supported on the shafts 50, 52 for vertical shifting movement by suitable bearings 78. It should be appreciated at this juncture that as the motor 58 is caused to be rotated in one direction or the other that the plate member 76 will be vertically shifted.

Measuring Means

Mounted upon the vertically shiftable plate member 76 are various portions of the measuring means. Thus, a sample viewing camera 80, an X-ray tube 82, and a proportional counter are all mounted on the plate member 76. During measurement, an X-ray beam, indicated by the arrow 86, will pass through a shutter 88, collimator 90, an aperture in mirror 92 and will impact upon the coating on the workpiece or elongate strip of material E, the secondary radiation being detected by the proportional counter 84, the elongate strip of material E being supported by a background bar 94 (FIG. 3). Suitable provisions are made to ensure that the surface of the coating to be measured is a precise distance away from the X-ray tube in order to achieve proper measurement of the coating thickness. A CRT screen 96 is coupled with the sample viewing camera 80 so that the operator of the apparatus of the present invention can determine whether or not the measuring means is in the proper location with respect to the measurement site, the view of the site being taken through the camera 80. The CRT screen 96 is supported upon an electronics enclosure 98, which enclosure is also supported on the H-frame members 34, 36. It should be obvious from the above that the vertically shiftable plate member can be moved in such a manner that the X-ray beam 86 can project at any vertical location on the elongate strip of material E. (Vertical shifting movement along the surface of the elongate strip will also be referred to a "Y" movement, whereas movement relative to the strip E in the direction of movement of the strip will be referred to as "X" movement.) In addition, the X-ray tube can be moved to a lower position where the X-ray beam can project upon one of a plurality of calibration reference standards. This feature will be described in greater detail below. At this point it should also be noted that the H-frame assembly 34–40, box-like structure 41–47, vertically shift plate member 76, and the electronics enclosure 98 all form part of the shuttle assembly 14.

Target-Spotting Assembly

The target-spotting assembly, indicated generally at 16 includes a target-spotting device 100 and target-spotting adjusting means indicated generally at 102. The target-spotting device 100 is a linear electronic scanning camera, although any electronic camera capable of recognizing specific features of the strip and providing signals for precise positioning of the measuring system may be used. This type of camera is capable of initiating both on-target and error signals. The camera and its supporting electronic equipment is programmable to specific character recognition and when the camera is not in precise alignment with the character or target that it is to recognize, it will send an error signal identifying to which side of the target it is so that it can be moved. (This will be more fully brought out below in the discussion of the operation.) The target-spotting adjusting means 102 includes a first adjustable mechanism 104, which adjustable mechanism 104 can move the target-spotting device in a "Y" direction transverse to the movement of the strip, and a second adjustable mechanism 106 mounted on the first mechanism 104, which mechanism 106 can move the target-spotting device in an "X" direction parallel to the movement of the strip E. The second adjustable mechanism 106 is mounted on the first mechanism 104 in a manner not material to the present invention. The first adjustable mechanism is in turn mounted upon a support 108 which is in turn secured to the right-hand H-frame member 34 and right side wall 42. As linear adjusting mechanisms are well known in the art, the details of the adjustable mechanisms 104 and 106 are not disclosed herein. However, it should be noted that these mechanisms can be adjusted either mechanically through handwheels or the like, or electronically through lead screws in a manner well known in the art. Once the mechanisms have been adjusted to precisely locate the target-spotting device 100 with respect to a measurement site M, which may be spaced several frames away from the target X, the camera will not be further adjusted during the particular run.

Drive Means

The drive means for driving the shuttle between the first and second locations includes a drive motor 110 which is mounted upon the top 22 of the support frame assembly 12. The output shaft of the drive motor 110 is coupled through coupler 112 to a lead screw 114, the end of the lead screw 114 remote from the motor 110 being supported in a suitable bearing assembly 116 also mounted on the top 22. The end of the lead screw adjacent the coupler 112 is also supported by the bearing assembly 118. A lead screw nut and bracket assembly 120 is disposed about the lead screw and is secured to slide plate 32 of the shuttle assembly 14. Therefore, it should be apparent that as the lead screw is caused to be rotated in one direction that the shuttle assembly will be moved in one direction, and that if the lead screw is rotated in another direction that the shuttle assembly will also be moved in another direction. In order to prevent the shuttle from overrunning either the right-hand or left-hand positions, the left-hand position being shown in FIG. 5, a limit switch 122 is provided. The limit switch 122 being mounted on the bottom front portion of the slide plate 32, the limit switch being able to contact right and left stops 124, 126 at either limit of movement of the shuttle. While the limit switch has been described as being mounted upon the slide plate 32 with the stops being shown mounted upon the fixed portion 26 of the linear bearing assembly 26-30, it should be obvious that limit switches may be substituted for the stops 124, 126 and a triggering mechanism may be substituted for the limit switch 122. These designs are well known in the art and they will not be described further. The drive means including a signal processor (mounted within the enclosure 98) which is responsive to a location signal from the target-spotting device and which causes the motor to drive the shuttle from the first or right-hand position to a second or left-hand position, initially positioning and then maintaining the target-sensing device in registry with the target X until the shuttle has approached the second position, at which time it will then drive the shuttle back towards the first position in preparation for repeating the sequence.

Elongated Strip Stabilizers

In some situations due to the nature of the elongate strip, it may have the tendency to flutter as it passes from the plating line equipment P to the first idler spool I downstream of the apparatus of this invention even though there may be spools (not shown) between the plating line P and the apparatus 10 of this invention. In order to prevent fluttering of the strip towards and away from the camera 100 the shuttle is provided, as best shown in FIG. 3, with left and right strip stabilizers indicated generally at 128 and 130, respectively, to either side of the X-ray device 82 and proportional counter 84. To this end, the shuttle is provided with a support plate 132 mounted on the rear wall of the box-like structure, the plate 132 being parallel with and spaced behind the elongate strip E. The right-hand and left-hand stabilizer assemblies 128, 130 are mounted on the plate 132. These stabilize assemblies are substantially identical to each other and are more fully illustrated in FIGS. 6 through 8. As can be seen from FIGS. 6 through 8 each of the stabilizer assemblies 128 or 130 consists of a roller 134 which is mounted eccentrically upon a vertically extending shaft 136. The shaft is in turned journalled to either side of the roller 134 in brackets 138 which are in turn connected to an auxiliary plate 140 which is adapted to be mounted on and parallel to support plate 132, there being suitable spacers 142 between the auxiliary plate 140 and the support plate 132. A further bracket 144 is mounted above the uppermost bracket 138, the further bracket supporting a rotary solenoid 146 which has an output shaft 148 coupled to the shaft 136 by means of a coupler 150. The rotary solenoid 140 is capable of initiating up to 90 degrees of movement, the position of the roller 134 being shown in FIG. 8 in its position when the solenoid is in its OFF position. When the solenoid is energized to its ON position, the shaft 136 will be rotated up to 90 degrees from the OFF position in a clockwise direction to bring the surface of the roller 136 into full engagement with the backside of elongate strip E. The angle of rotation is chosen to bring the roller into slight contact with the strip.

Background Bar

The background bar 94 which has been previously referred to in this description, is mounted upon a lever 152 (FIG. 3) which is pivotally secured to a bracket 154, the bracket 154 in turn being mounted upon the back wall 47 of the box-like structure. The end of the lever 152 adjacent the background bar 94 is also connected to the back wall 47 by a pair of links 155, 156. One end of link 155 being pivotally secured to wall 47, one end of link 156 being pivotally secured to the other end of link 155, and the other end of link 156 being pivotally secured to lever 152 adjacent the background bar 94. A linear acting solenoid, shown schematically at 158, is provided with an outwardly extending shaft which can be moved to the left or the right when viewed in FIG. 3, the right-hand end of the shaft 160 being coupled to the pivot between pivoted links 155 and 156 as shown. When the linear solenoid 158 is in its OFF position, the shaft 160 will be in its right-hand position, as shown, and will be maintained in that position by a spring 162, one end of which is secured to a bracket 164 on back wall 47. When the solenoid 158 is shifted to its ON position, the shaft 160 will be moved to the left extending the background bar into contact with the strip E.

Adjustable means may be provided for limiting the movement of the background bar 94 into light contact with the strip. While the background bar 94 is shown in contact with the strip E in FIG. 3, this illustration is for the purpose of convenience only, as normally the background bar 94 would not be in contact when the solenoid 158 is in its OFF condition.

Calibration Reference Standards

As has been previously discussed the sample viewing camera 80 and a portion of the measuring means, namely the X-ray tube 82 and proportional counter 84, are all mounted for vertical movement on the vertically shiftable plate 76. If the elongate strip to be measured has a 4-inch width, one extra inch of movement is designed into the movement of plate 76 so that the X-ray tube can be moved to a position where the X-ray beam 86 is 1 inch below the elongate strip to place it in alignment with calibration reference standards. In the past, as for example U.S. Pat. No. 4,656,358, it has been known to mount a plurality of calibration reference standards in a linear array for the purpose of calibrating the measuring apparatus. However, it is a further feature of the present invention to provide a novel mounting structure for a plurality of calibration reference standards. Accordingly the standards are mounted upon a rotatable disk which is indexable to various positions to bring each standard into aligned position with the X-ray beam 86 when plate 76 is moved to one side of strip E. Thus, a stepping motor 166 may be suitably mounted upon a base plate 168 of proper thickness, which base plate is in turn secured to the rear plate 47 of the box-like structure 41-47. The output shaft 170 of the stepping motor 166 has mounted thereon a rotatable disk 172 provided with a plurality of calibration reference standards 174. In order to readily remove the calibration disk 172 from the output shaft 170, the disk is provided with a pair of keyhole slots 176 to either side of its centerline, which keyhole slots may receive screws 178 which are in turn screwed into a circular support 180, which support 180 is in turn mounted upon the output shaft 170 by a setscrew 182. The calibration disk is removed from the circular support 180 by loosening the two screws 178 and then by sliding and lifting the disk 172 off the support 180. To reassemble the reverse order is followed. In order to provide for suitable control of the stepping motor 166 and to maintain its precise position, a home flag pin 184 is mounted on the disk 172, the position of the pin being sensed by an interrupting senser assembly 186 which is coupled to suitable electronics within the electronics enclosure 98 by lead wires 188.

Operation

If the measuring means of this invention has not previously been calibrated, it will be calibrated by moving the plate member 76 to its down position to place the X-ray beam 86 is in alignment with one of the calibration reference standards 174. The disk 172 will be suitably indexed to place the beam 86 in alignment with those calibration standards 174 necessary to calibrate the measuring means. At the completion of the calibration, the plate 76 will again be moved up to its desired operational position where the X-ray beam 86 may be placed in alignment with the desired measurement site. The calibration, as well as the initial positioning may be under the control of various controls mounted upon a control box 190 carried to one side of the shuttle as shown in FIG. 2.

It will be necessary to position the target-spotting device or camera. To this end, it should appreciated that the measuring means, or at least the portion which generates the X-ray beam 86 and the proportional counter 84, can only be adjusted across the surface of the elongate strip in a "Y" direction by means of vertical movement of the vertically shiftable plate member 76. As it is necessary to vertically shift the plate 76 in order to have the X-ray beam 86 in proper vertical or "Y" orientation with measuring site M, it is then necessary to properly locate the target-spotting device with respect to the X-ray beam so that the target-spotting device will have the proper "XY" relationship to the measuring site. Accordingly, X and Y movement of the target-spotting device is provided by the first and second adjustable mechanisms 104, 106. These mechanisms will be suitably adjusted therefore so that the target-spotting device has the same XY spatial relationship to the X-ray beam 86 that a target X has to the particular measurement site M which is to be measured. In this regard it should be noted that the target X may be, as shown in the preferred illustrated embodiment, in a frame different than the location site M. However, because each frame is substantially identical with every other frame and since the distance between each frame is the same, this does not present a problem in setting up the apparatus. Typically though a target will be selected which is several frames upstream of the desired measurement site.

Once the initial position of the camera 100 has been achieved, and with the elongate strip E moving through the apparatus 10, the shuttle will be brought to its full right-hand position and then the motor 110 will initiate movement of the shuttle towards the left at a rate of speed different from the speed of the elongate strip. The camera 100, which has previously been programmed to recognize the specific target X, will detect when the camera is ahead of, behind, or in registry with the target X. If it is in registry, an on-target signal will be initiated which will cause the shuttle to be moved at the same speed as the elongate strip E. If an error signal is received, the motor 110 will be controlled in such a manner as to speed up or slow down the shuttle until an on-target signal is received at which time the shuttle will be maintained at the same speed as the elongate strip. This motion will continue until the shuttle approaches its left-hand position. While the target-spotting device is on-target, the measuring means will be utilized to detect the thickness at the desired location site. It may be desirable to repeat this process at a number of sites in order to get an average reading and therefore this procedure can be repeated as often as required. It may also be desired to measure other sites which have a differing spatial relationship to the targets and subsequent measurements may also be initially programmed into the apparatus.

While a preferred structure in which the present invention has been incorporated is shown and described above, it is to be understood that this invention is not to be limited to the particular details shown and described above, but that, in fact, widely differing means may be employed in the practice of the broader aspects of this invention.

What is claimed:
1. An apparatus for measuring the thickness of a coating on an elongate strip of material at selected measure- ment sites while the elongate strip of material is moving along a predetermined path from a first location to a second location, each measurement site having a specific placement relative to an associated target on the strip; the apparatus comprising:

a support frame assembly;

a shuttle mounted on the support frame assembly for movement between first and second locations;

a target-spotting device carried by the shuttle for initiating a location signal as the target-spotting device is brought into synchronism with a target associated with a selected measurement site;

drive means responsive to the location signal for driving the shuttle assembly from the first location towards the second location to position and maintain the target-spotting device in registry with the target; and measuring means having a portion mounted on the shuttle for measuring the thickness of the coating at the selected measurement site when the target-spotting device is in registry with the target during movement of the shuttle from the first location to the second location.

2. The apparatus as set forth in claim 1 wherein strip stabilizers are provided, the stabilizers being mounted on the shuttle for preventing oscillation of the elongate strip during focusing.

3. The apparatus as set forth in claim 1 wherein a background bar is mounted on the shuttle and is movable into engagement with the back surface of the elongate strip to provide a suitable background during measurement of the coating at the measurement site, and wherein the portion of the measuring means mounted on the shuttle includes an X-ray emitting device.

4. The apparatus as set forth in claim 1 wherein target-spotting adjusting means are provided for adjusting the distance between the target-spotting device and the portion of the measuring means mounted on the shuttle which is in register with the measurement site where the coating is to be measured, the target-spotting adjusting means being mounted on the shuttle and the target-spotting device being mounted on the target-spotting adjusting means.

5. The apparatus as set forth in claim 4 wherein the target spotting adjusting means may move the target-spotting device across the surface of the elongate strip in a "Y" direction transverse to the movement of the strip.

6. The apparatus as set forth in claim 4 wherein the target spotting adjusting means may move the target-spotting device across the surface of the strip in an "X" direction parallel to the movement of the strip.

7. The apparatus as set forth in claim 1 wherein the portion of the measuring means on the shuttle is mounted for adjustable movement across the surface of the strip in a "Y" direction transverse to the movement of the strip.

8. The apparatus as set forth in claim 7 further characterized by the provision of a plurality of calibration reference standards supported on the shuttle to one side of the elongate strip, and wherein the portion of the measuring means mounted on the shuttle which is placed in register with the measurement site is movable to one side of the elongate strip to a location in alignment with any of the calibration reference standards for the purpose of calibrating the measuring means.

9. The apparatus as set forth in claim 8 wherein the calibration reference standards are mounted on a rotatable disk, the reference standards being indexable to provide differing standards when the portion of the measuring means is to one side of the elongate strips.

10. An apparatus for measuring the thickness of a coating on an elongate strip of material at selected measurement sites while the elongate strip of material is moving along a predetermined path from a first location to a second location, each measurement site having a specific placement relative to an associated target on the strip; the apparatus comprising:

a support frame assembly;

a shuttle mounted on the support frame assembly for movement between first and second locations;

a target-spotting device for initiating a location signal as the target-spotting device zeroes in on a target associated with a selected measurement site, the target-spotting device being carried by the shuttle for adjustable movement both in a "Y" direction transverse to the direction of movement of the elongate strip and an "X" direction parallel to the direction of movement of the elongate strip;

drive means responsive to the location signal for driving the shuttle from the first location towards the second location to establish and maintain the target-spotting device in registry with the target; and measuring means for measuring the thickness of the coating at the selected measurement site when the target-spotting device is in registry with the target during movement of the shuttle from the first location to the second location, the measuring means having a portion adjustably mounted to the shuttle for movement in a direction transverse to the direction of movement of the strip.

11. An apparatus for measuring the thickness of a coating on an elongate strip of material at selected measurement sites while the elongate strip of material is moving along a predetermined path from a first location to a second location, each measurement site having a specific placement relative to an associated target on the strip; the apparatus comprising:

a support frame assembly;

a shuttle mounted on the support frame assembly for movement between first and second locations;

a target-spotting device carried by the shuttle for initiating a location signal as the target-spotting device zeroes in on a target associated with a selected measurement site, the target-spotting device including an electronic camera capable of initiating an on-target signal when the electronic camera is in registry with the target site and an error signal when the electronic camera is not in registry with the target site;

drive means responsive to either the on-target signal or the error signal received from the target-spotting device for driving the shuttle from the first location towards the second location to initially position the target-spotting device in registry with the target when an error signal is being received and to subsequently maintain the target-spotting device in registry with the target when an on-target signal is being received; and measuring means having a portion mounted on the shuttle for measuring the thickness of the coating at the selected measurement site when the target-spotting device is in registry with the target during movement of the shuttle from the first location to the second location.

12. The apparatus as set forth in claim 11 wherein the electronic camera is programmable to specific character recognition in a direction parallel to and a direction transverse to a specific target plus or minus the distance equal to the distance between the selected measurement site and the associated target measured in a direction parallel to the direction of movement of the strip.

* * * * *